United States Patent
Berg et al.

(10) Patent No.: US 8,438,468 B2
(45) Date of Patent: May 7, 2013

(54) ANNOTATION MANAGEMENT

(75) Inventors: Daniel Christopher Berg, Cary, NC (US); Michael Damein Elder, Durham, NC (US); Timothy Marc Francis, Newmarket (CA); Patrick James Kelley, Jr., Chapel Hill, NC (US); John David Lanuti, Raleigh, NC (US); Narinder Makin, Morrisville, NC (US); Jason Robert McGee, Apex, NC (US); Sachin Pravin Patel, Raleigh, NC (US); Lawrence Scott Rich, Cary, NC (US); Ritchard Leonard Schacher, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 581 days.

(21) Appl. No.: 11/107,544

(22) Filed: Apr. 15, 2005

(65) Prior Publication Data

US 2006/0248523 A1 Nov. 2, 2006

(51) Int. Cl.
*G06F 17/24* (2006.01)
*G06F 17/25* (2006.01)

(52) U.S. Cl.
USPC ............................ 715/230; 717/106; 717/121

(58) Field of Classification Search .................. 715/512, 715/749, 230, 264; 717/106, 121, 123
See application file for complete search history.

(56) References Cited

U.S. PATENT DOCUMENTS

| | | | |
|---|---|---|---|
| 5,581,682 A | 12/1996 | Anderson et al. | 395/792 |
| 5,748,878 A * | 5/1998 | Rees et al. | 714/38.13 |
| 6,571,295 B1 * | 5/2003 | Sidana | 709/246 |
| 6,572,661 B1 * | 6/2003 | Stern | 715/203 |
| 6,687,878 B1 | 2/2004 | Eintracht et al. | 715/512 |
| 6,871,318 B1 * | 3/2005 | Wynblatt et al. | 715/201 |
| 7,100,152 B1 * | 8/2006 | Birum et al. | 717/131 |
| 7,222,333 B1 * | 5/2007 | Mor et al. | 717/115 |
| 7,266,766 B1 * | 9/2007 | Claussen et al. | 715/234 |
| 7,584,458 B2 * | 9/2009 | Das et al. | 717/126 |
| 7,774,697 B2 * | 8/2010 | Olander et al. | 715/234 |
| 7,886,281 B2 * | 2/2011 | Smith et al. | 717/130 |
| 2002/0019837 A1 * | 2/2002 | Balnaves | 707/512 |
| 2002/0188831 A1 * | 12/2002 | Jackson et al. | 712/227 |
| 2003/0103071 A1 | 6/2003 | Lusen et al. | 345/705 |
| 2004/0001631 A1 | 1/2004 | Camara et al. | 382/224 |
| 2004/0111701 A1 * | 6/2004 | Beust | 717/108 |
| 2004/0199516 A1 * | 10/2004 | Thames et al. | 707/100 |
| 2006/0048047 A1 * | 3/2006 | Tao | 715/512 |
| 2006/0225053 A1 * | 10/2006 | Lakshman et al. | 717/140 |

(Continued)

OTHER PUBLICATIONS

Azevedo et al.,"High P_erformance Annotation-aware JVM for Java Cards",2005, ACM, pp. 52-61.*

(Continued)

*Primary Examiner* — Doug Hutton, Jr.
*Assistant Examiner* — James Debrow
(74) *Attorney, Agent, or Firm* — Steven M. Greenberg, Esq.; Carey, Rodriguez, Greenberg & O'Keefe

(57) ABSTRACT

The invention, which may be a kind of annotations processor, detects zero or more tagsets turned on or selected at runtime. The annotations adapter reads an abstract unit from a java file, and if an annotation of the abstract unit has a tag that is among the tags of a turned on tagset, then the annotations adapter may generate an artifact showing the influence of the annotation. Such a process may continue until there are no more abstract units to process. Comments or annotations that fail to be tagged with a tag of a selected tagset may, nevertheless, be mentioned with a kind of 'place-holder' indicating that such comments exist.

2 Claims, 4 Drawing Sheets

U.S. PATENT DOCUMENTS

2006/0248523 A1* 11/2006 Berg et al. .................. 717/174
2007/0234318 A1* 10/2007 Seto et al. .................. 717/140

OTHER PUBLICATIONS

Ferreira et al.,"A Java Code Annotation Approach for Model Checking Software Systems", ACM, 2007, pp. 1536-1537.*

Nagao et al., "Automatic Text Summarization Based on the Global Document Annotation", Google, 1998, pp. 917-921.*

Heliotis, James, "Automated Laboratory Artifact Production", ACM, 2004, pp. 205-213.*

Mount et al.,"Exstatic—A Generic Static Checker Applied to Documentation Systems", ACM, 2004, pp. 52-57.*

* cited by examiner

// tagsert.ejb=on ; tagset.webservice=off /501  503

```
/**
 @ejb. bean  509                              521
    name="HelloWorld"
    type="stateless"
    jndi-name="ejb/ejbs/HelloWorldHome"
    view-type="remote"
    transaction-type="container"
 @ejb. home  511
    remote-class="ejbs.HelloWorldHome"
    @ejb.interface
    remote-class="ejbs.HelloWorld"
*/
public class HelloWorldBean implements SessionBean {
```

FIG. 5

ANNOTATION MANAGEMENT

BACKGROUND OF THE INVENTION

1. Technical Field

The present invention generally relates to software development tools, and more specifically to a way to write software source files at a high level of abstraction and selectively implement, compile or otherwise convert to concrete code and documentation on the basis of annotations within the highly abstract file.

2. Description of Related Art

Annotations are tracts of text that are added to source files, e.g. Java type source, that may be processed to generate artifacts. Artifacts may include other source files of the same or a different language, and metadata. Metadata includes information which describes the original file or produced artifacts. Metadata may include information which is machine and/or human readable. Examples of metadata include deployment descriptors for Java 2 Enterprise Edition applications and modules or documentation produced by the Javadoc tool.

Among the files that annotations may drive the creation of, are: Enterprise JavaBeans (EJBs), Java Data Objects (JDO), Java Servlets, Java Management Extensions (JMX), and Remote Method Invocation (RMI) artifacts. The use of annotations allows integration of information related to but not explicitly specified by source code, which can lower the maintenance costs associated with the source files.

In the case of the Java programming language, there are two modes of annotation. In the first form, annotations are embedded into source file comments. In the second form, annotations are embedded into the space reserved for the Java language reserved words.

The Javadoc tool distributed as part of the Java specification provides an example of annotations in the first form. A sample of a Javadoc annotation is shown in the following excerpt from a Java file. The annotation is embedded in the comment which is set off at the beginning by the text "/**", and at the end by "*/".

```
/**
    @param p1 The first parameter of the method
    @return Astring of interesting information
    @throws IOException if the disk is inaccessible
*/
public String method(Object p1){
```

Annotations are of particular benefit when using Java 2 Enterprise Edition (J2EE) applications for the generation of Enterprise Java Bean (EJB) metadata used in deployment.

Annotations are a convenient and systematic way to attach information to program elements that may be automatically extracted. Extraction may be done by tools that create artifacts, some of which may be in an XML format.

Among the benefits of annotations, is the ability to create various software-development artifacts, including documentation, from a concise, core, Java file. Because there are often alternate environments that a Java file must be compiled and/or configured to operate, annotations may be used to specify how the Java file itself must be processed to create the artifacts necessary for each environment. For example, some annotations may relate only to code development that targets Enterprise Java Bean (EJB). Thus some annotations may be relevant to EJB. In other situations, some annotations may relate only to code development that targets Web Services. In the foregoing example, a common Java file would have at least two sets of annotations, wherein each logical group associated by function is known as a tagset. A tagset is a collection of annotations which are associated with a particular type of generated artifacts and/or metadata. Thus a developer could have a tagset for Web Services, and another tagset for EJB.

Currently software development tools process all annotations. This, unfortunately, forces a developer to redact annotations for the non-preferred tagset—essentially destroying an option that could be useful later, or even worse, requiring a developer to keep, update and revise at least two different Java files for the same project. In practice, this proves inefficient and redundant—sometimes confusing the developer and making extra work.

In view of the foregoing, there exists a need for selecting tagsets of annotations before or during the processing of Java files.

BRIEF SUMMARY OF THE INVENTION

The present invention provides a method, apparatus and computer instructions showing how a metamodel object may be extended with an annotations processor to receive a processing instruction, which may select one or more tagsets, but indicate that other tagsets are to be ignored. The metamodel object may read items having annotations, i.e. abstract units, wherein the abstract units have annotations prefaced with a tag from a selected tagset. The metamodel object may determine that the tagset to which the tag belongs matches a selected tagset indicated by the processing instruction selected in the first step. Having found a matching tagset, the metamodel object generates an artifact, e.g. an Enterprise Java Bean (EJB).

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is an example of a Javadoc annotation upon which an embodiment of the invention may operate.

DETAILED DESCRIPTION OF THE INVENTION

Figure 1:
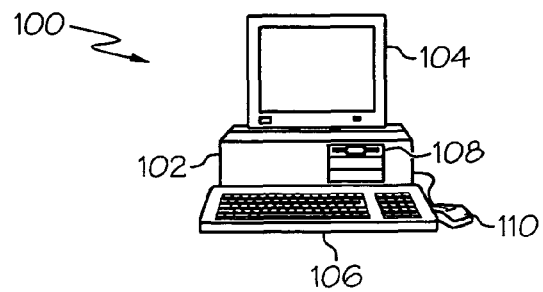
FIG. 1 is a generic computer system according to an embodiment of the invention in accordance with an illustrative embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
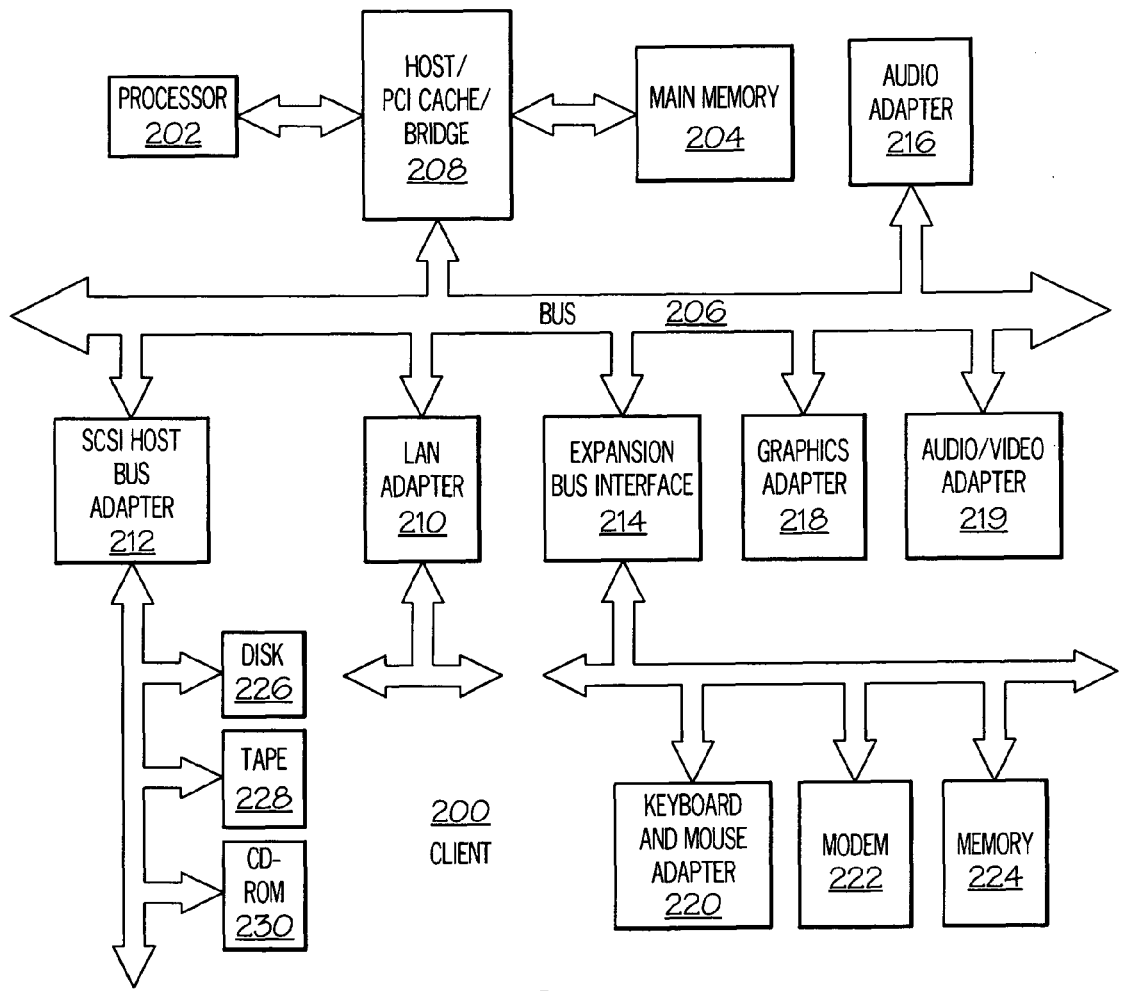
FIG. 2 is data processing system according to an embodiment of the invention in accordance with an illustrative embodiment of the present invention.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface (SCSI) host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance. The processes of the present invention are performed by processor 202 using computer implemented instructions, which may be located in a memory such as, for example, main memory 204, memory 224, or in one or more peripheral devices 226-230.

Figure 3:
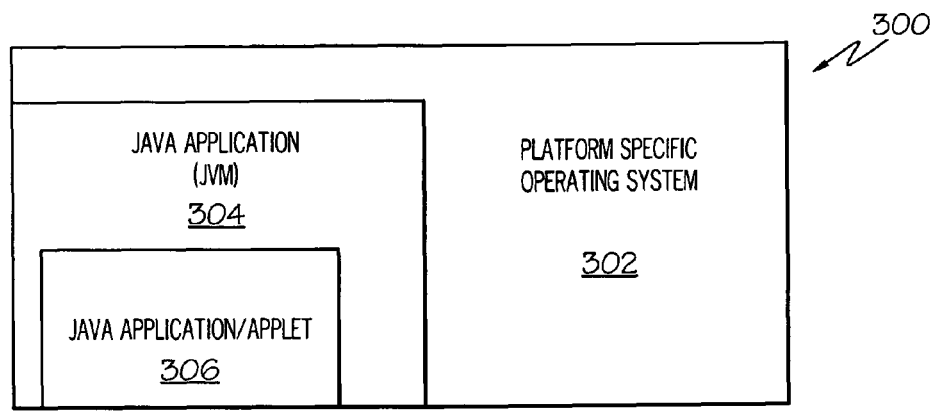
FIG. 3 is a block diagram showing the relationship of software components operating within an illustrative computer system embodiment of the present invention.

With reference now to FIG. 3, a block diagram illustrates the relationship of software components operating within a computer system that may implement the present invention. Java-based system 300 contains platform specific operating system 302 that provides hardware and system support to software executing on a specific hardware platform. JVM 304 is one software application that may execute in conjunction with the operating system. JVM 304 provides a Java run-time environment with the ability to execute Java application or applet 306, which is a program, servlet, or software component written in the Java programming language. The computer system in which JVM 304 operates may be similar to data processing system 200 or computer 100 described above. However, JVM 304 may be implemented in dedicated hardware on a so-called Java chip, Java-on-silicon, or Java processor with an embedded picoJava core.

At the center of a Java run-time environment is the JVM, which supports all aspects of Java's environment, including its architecture, security features, mobility across networks, and platform independence.

The JVM is a virtual computer, i.e. a computer that is specified abstractly. The specification defines certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for mainframe computers and PDAs.

The JVM is the name of a virtual computer component that actually executes Java programs. Java programs are not run directly by the central processor but instead by the JVM, which is itself a piece of software running on the processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run-time system. The Java compiler generates bytecode instructions that are nonspecific to a particular computer architecture. A bytecode is a machine independent code generated by the Java compiler and executed by a Java interpreter. A Java interpreter is part of the JVM that alternately decodes and interprets a bytecode or bytecodes. These bytecode instructions are designed to be easy to interpret on any computer and easily translated on the fly into native machine code. Byte codes are may be translated into native code by a just-in-time compiler or JIT.

A JVM loads class files and executes the bytecodes within them. The class files are load by a class loader in the JVM. The class loader loads class files from an application and the class files from the Java application programming interfaces (APIs) which are needed by the application. The execution engine that executes the bytecodes may vary across platforms and implementations.

One type of software-based execution engine is a just-in-time compiler. With this type of execution, the bytecodes of a method are compiled to native machine code upon successful fulfillment of some type of criteria for jitting a method. The native machine code for the method is then cached and reused upon the next invocation of the method. The execution engine may also be implemented in hardware and embedded on a chip so that the Java bytecodes are executed natively. JVMs usually interpret bytecodes, but JVMs may also use other techniques, such as just-in-time compiling, to execute bytecodes.

When an application is executed on a JVM that is implemented in software on a platform-specific operating system, a Java application may interact with the host operating system by invoking native methods. A Java method is written in the Java language, compiled to bytecodes, and stored in class files. A native method is written in some other language and compiled to the native machine code of a particular processor. Native methods are stored in a dynamically linked library whose exact form is platform specific.

Figure 4:
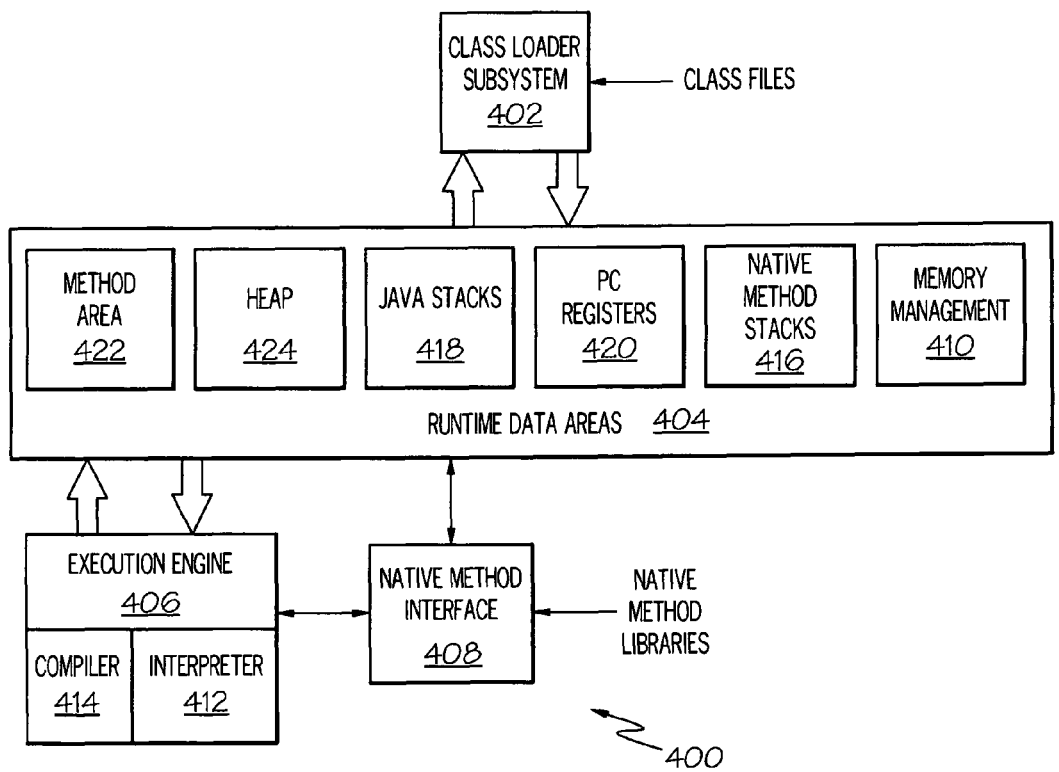
FIG. 4 is a block diagram of a Java Virtual Machine (JVM) in accordance with an illustrative embodiment of the present invention.

With reference now to FIG. 4, a block diagram of a JVM is depicted in accordance with a preferred embodiment of the present invention. JVM 400 includes class loader subsystem 402, which is a mechanism for loading types, such as classes and interfaces, given fully qualified names. JVM 400 also contains runtime data areas 404, execution engine 406, native method interface 408, and memory management 410. Execution engine 406 is a mechanism for executing instructions contained in the methods of classes loaded by class loader subsystem 402. Execution engine 406 may be, for example, Java interpreter 412 or just-in-time compiler 414. Native method interface 408 allows access to resources in the underlying operating system. Native method interface 408 may be, for example, the Java Native Interface (JNI).

Runtime data areas 404 contain native method stacks 416, Java stacks 418, PC registers 420, method area 422, and heap 424. These different data areas represent the organization of memory needed by JVM 400 to execute a program.

Java stacks 418 are used to store the state of Java method invocations. When a new thread is launched, the JVM creates a new Java stack for the thread. The JVM performs only two operations directly on Java stacks: it pushes and pops frames. A thread's Java stack stores the state of Java method invocations for the thread. The state of a Java method invocation includes its local variables, the parameters with which it was invoked, its return value, if any, and intermediate calculations. Java stacks are composed of stack frames. A stack frame contains the state of a single Java method invocation. When a thread invokes a method, the JVM pushes a new frame onto the Java stack of the thread. When the method completes, the JVM pops the frame for that method and discards it. The JVM does not have any registers for holding intermediate values; any Java instruction that requires or produces an intermediate value uses the stack for holding the intermediate values. In this manner, the Java instruction set is well-defined for a variety of platform architectures.

Program counter (PC) registers 420 are used to indicate the next instruction to be executed. Each instantiated thread gets its own PC register and Java stack. If the thread is executing a JVM method, the value of the PC register indicates the next instruction to execute. If the thread is executing a native method, then the contents of the PC register are undefined. Native method stacks 416 stores the state of invocations of native methods. The state of native method invocations is stored in an implementation-dependent way in native method stacks, registers, or other implementation-dependent memory areas. In some JVM implementations, native method stacks 416 and Java stacks 418 are combined.

Method area 422 contains class data while heap 424 contains all instantiated objects. The constant pool is located in method area 422 in these examples. The JVM specification strictly defines data types and operations. Most JVMs choose to have one method area and one heap, each of which are shared by all threads running inside the JVM, such as JVM 400. When JVM 400 loads a class file, it parses information about a type from the binary data contained in the class file. JVM 400 places this type of information into the method area. Each time a class instance or array is created, the memory for the new object is allocated from heap 424. JVM 400 includes an instruction that allocates memory space within the memory for heap 424 but includes no instruction for freeing that space within the memory. Memory management 410 in the depicted example manages memory space within the memory allocated to heap 424. Memory management 410 may include a garbage collector, which automatically reclaims memory used by objects that are no longer referenced. Additionally, a garbage collector also may move objects to reduce heap fragmentation.

FIG. 5 shows an example of an enhanced Java file that an embodiment of the invention can process. The first line 501 shows a tagset instruction that instructs the embodiment that the ejb tagset, associated with Enterprise Java Beans, is a selected tagset instruction. This is accomplished through the well known, 'tagset' keyword, which prefaces the name of the tagset. In this case the tagset 'ejb' is turned on or selected, and the 'webservice' tagset is turned off or deselected. An abstract unit 503 follows, set off by a beginning delimiter and an ending delimiter. The tagset that is selected by the tagset instruction contains some tags. Each time the '@ejb' string occurs within the abstract unit 503, the processor matches the string following the '@' to detect the name of a tagset that is a selected tagset, in this case 'ejb' is turned on in accordance with the first instruction line 501. The text following the '.' is the name of the applicable tag, e.g. 'bean' 509, that is contained in the tagset. A selection of "=on" or "=off" is an instruction to process the alpha-numeric string prior to the strings "=on" or "=off" as a selected tagset. The literal matching is used here as an example, but the design does enforce a limitation of literal matching.

Contents of the tag may follow after the string for the tag and continue until another tag is found, e.g. 'home' 511. What then is contained by the tag, or is the contents to the tag, may be a number of variables or instructions 521 that are well-formatted according to the language and conventions of the separate routine that processes the variables and/or instructions into the desired artifact, in this part of the example, an Enterprise Java Bean.

Since the 'webservice' tagset is turned off or deselected, had the FIG. 5 example included within the abstract unit 503, a line starting with @webservice, the processor embodiment would have ignored it, or inhibited an action that would otherwise have occurred. A natural extension considered part of the design would be that the disablement of an annotation tagset prompts the removal of artifacts previously generated.

Figure 6:
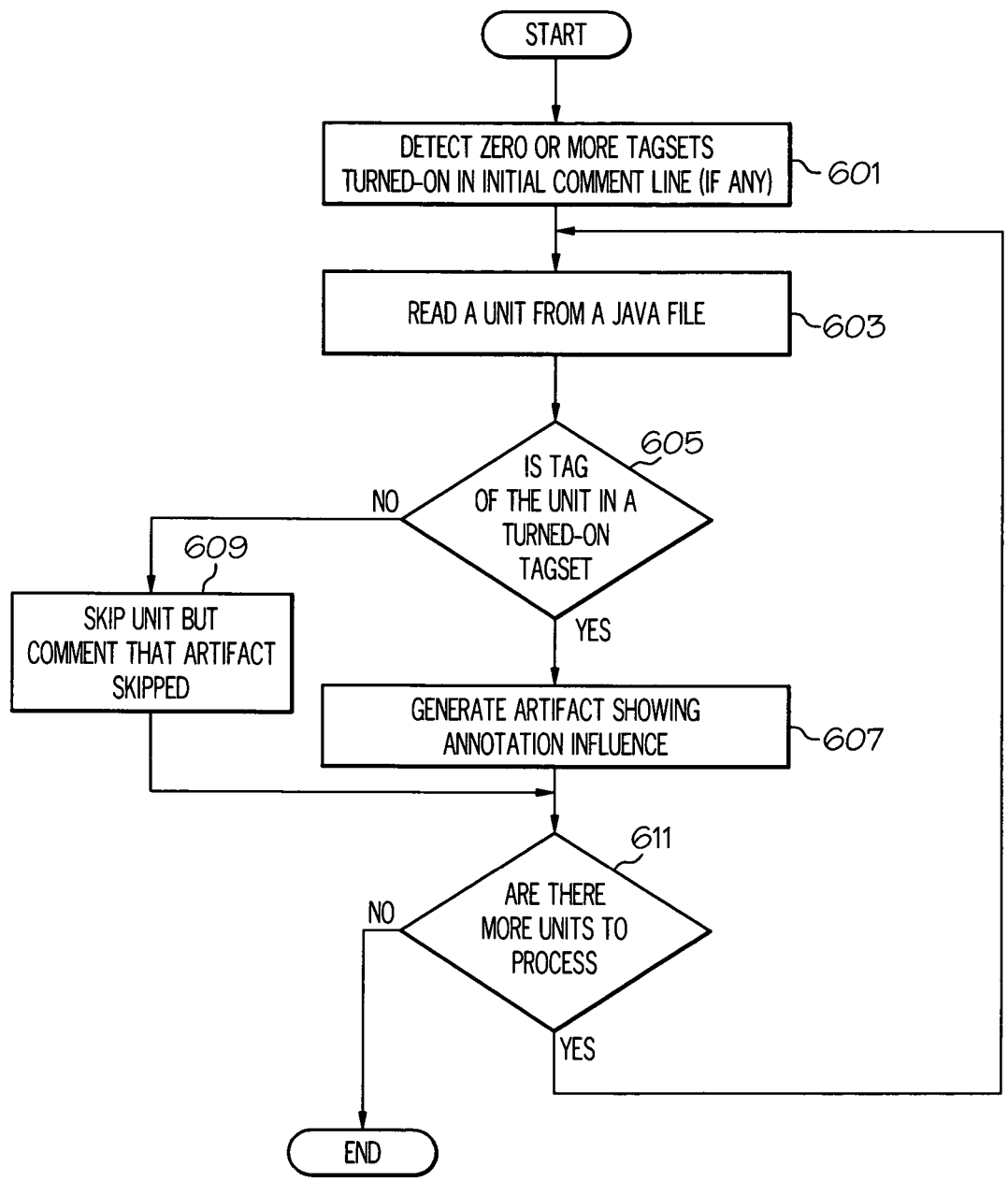
FIG. 6 is a data flow diagram showing steps performed in accordance with an illustrative processor embodiment of the present invention.

Referring to FIG. 6 there is shown a flow diagram of the steps an embodiment may perform to arrive at the desired set of artifacts to be derived from the Java file. A processor may open a Java file and read a selected tagset instruction (step 601). In the case of the FIG. 5 Java file, processor may read the line, and determine that the ejb tagset is "turned on". The processor may be a standalone program that reads the Java file, or the processor may be a subroutine or other supporting program that receives a selected tagset instruction from another program or object that does the file handling. In any event, whether a read of a file occurs, or a set of parameters is passed to another subroutine or object, the processor receives a selected tagset instruction (step 601).

Once the tagset instructions are noted or stored into an appropriate data structure, the processor may read an abstract unit from the file (step 603). The abstract unit may comprise one or more tags-comments, i.e. a tag such as in table 1.

TABLE 1

@ejb.home
remote-class="ejbs.HelloWorldHome"

The abstract unit may further comprise comment delimiters such as "/**" or "*/" or be comprised of annotations embedded directly into the source code. Optionally, the abstract unit may be followed by other text and any number of white-spaces, e.g. object or class definitions.

The processor examines the first abstract unit for tags. If a tag is found to be among tags in a tagset that is turned on, i.e. whether the first tagset matches the selected tagset instruction (step 605), then further action is taken. A 'match' includes finding a substring within the searched text, and may include case-insensitive matching. It may also include converting the subject of the match to a toggled bit, and comparing a data structure of toggled bits for an 'AND'-style match. However, once all tags of an abstract unit are read, if all tags are either turned off, or otherwise not selected for artifact-generation, the embodiment may write to an artifact file a place-holder statement. In other words, the place-holder statement may merely mention that the abstract unit was skipped (step 609), though it is available in the Java file.

If the abstract unit has a tag that is a member of a tagset that is turned on (step 605) (matches the selected tagset instruction), then the processor generates an artifact based on that annotation (step 607). By 'generate', it is meant that a file could be appended to with a portion/part/unit that derives from the text inputted to the generate text.

Further abstract units may be detected (step 609) and if so, processor will resume steps at the reading an abstract unit (step 603). This loop continues until all abstract units of the Java file have been handled by processor. Alternatively, in a dynamic programming environment, such a loop may be ended on the command of the user.

The various embodiments of the invention may disable some annotation with respect to artifact generation, but retain annotations stored in the file. The solution allows developers to fluctuate between using annotations and not using annotations on a per-file, per-tagset basis, and without re-annotating the rich content.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for generating software development artifacts from respective code sections selectively annotated as active, the method comprising:

parsing source code to identify both active and inactive tagsets of tags;

identifying in the source code, code sections annotated with a tag in a tagset identified as active, and code sections annotated with a tag in a tagset identified as inactive; and, skipping processing of the code sections annotated with a tag in a tagset identified as inactive, but generating artifacts external to the source code for the code sections annotated with a tag in a tagset identified as active.

2. The method for generating of claim 1 further comprising writing a place-holder statement to an artifact file for each code section in the source code skipped for processing for having been annotated with a tag in a tagset identified as inactive.

* * * * *